United States Patent
Yasuhiko

(10) Patent No.: US 7,558,005 B2
(45) Date of Patent: Jul. 7, 2009

(54) COMPACT LENS SYSTEM

(75) Inventor: Abe Yasuhiko, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 0 days.

(21) Appl. No.: 12/221,366

(22) Filed: Aug. 1, 2008

(65) Prior Publication Data

US 2009/0109549 A1 Apr. 30, 2009

(30) Foreign Application Priority Data

Oct. 25, 2007 (KR) .................... 10-2007-0107804

(51) Int. Cl.
*G02B 3/02* (2006.01)

(52) U.S. Cl. .............. 359/715; 359/738; 359/739; 359/771; 359/773; 359/774

(58) Field of Classification Search ............. 359/715, 359/738, 739, 771, 773, 774
See application file for complete search history.

(56) References Cited

U.S. PATENT DOCUMENTS

| | | | |
|---|---|---|---|
| 4,606,607 A * | 8/1986 | Kurihara | 359/715 |
| 6,282,033 B1 * | 8/2001 | Ning | 359/739 |
| 6,744,570 B1 * | 6/2004 | Isono | 359/771 |
| RE38,799 E * | 9/2005 | Ning | 359/739 |
| 7,012,765 B2 * | 3/2006 | Matsui et al. | 359/771 |
| 7,079,330 B2 * | 7/2006 | Lee et al. | 359/771 |
| 7,274,518 B1 | 9/2007 | Tang et al. | |
| 2004/0136097 A1 | 7/2004 | Park | |
| 2008/0043346 A1 * | 2/2008 | Sano | 359/715 |

* cited by examiner

*Primary Examiner*—Evelyn A. Lester
(74) *Attorney, Agent, or Firm*—Drinker Biddle & Reath LLP

(57) ABSTRACT

A compact lens system that includes a first lens that is a meniscus lens with positive refractive power and having aspheric surfaces on both sides, and a convex surface on a surface facing an object; a second lens formed of a biconcave lens having aspheric surfaces on both sides; a third lens having aspheric surfaces on both sides and having positive refractive power; and a fourth lens formed of a biconcave lens having aspheric surfaces on both sides and an inflection point on an upper aspheric surface. The first through fourth lenses are arranged sequentially from the object, and an aperture diaphragm is disposed on the object side of the first lens.

8 Claims, 6 Drawing Sheets

COMPACT LENS SYSTEM

CROSS-REFERENCE TO RELATED PATENT APPLICATIONS

This application claims the benefit of Korean Patent Application No. 10-2007-0107804, filed on Oct. 25, 2007, in the Korean Intellectual Property Office, the disclosure of which is incorporated herein in its entirety by reference.

BACKGROUND OF THE INVENTION

1. Field of the Invention

The present invention relates to a compact lens system for an electronic still camera including a solid state imaging device such as a charge coupled device (CCD) or a complementary metal oxide semiconductor (CMOS).

2. Description of the Related Art

As the use of electronic devices such as portable digital assistances (PDAs) and mobile devices has greatly increased, digital cameras and digital video units are frequently built in such electronic devices. Accordingly, demands for small sized cameras have increased. In order to satisfy these demands, a lens system that is smaller than that used in conventional digital cameras is required. A lens system included with mobile devices has more size limitations than a lens system mounted on a conventional digital camera.

On the other hand, an exit ray angle (hereinafter, referred to as an exit angle) of a principal ray can be realized within a range of 20° to 25° due to the development of solid state imaging devices, and accordingly, thin and small sized lens systems have been developed.

In order to fabricate a thin and small sized lens system, the pixel pitch of an imaging device should be smaller than 2 μm and the resolution of the imaging device should be improved. However, when the pixel pitch of the imaging device is reduced, the resolution of the imaging device is degraded, and thus, it is difficult to satisfy the above two conditions.

For example, a system having three lenses was suggested in order to realize a thin lens system; however, compensation of chromatic aberration with the pixel pitch of 2 μm or less cannot be satisfactorily performed, and thus, it is difficult to obtain the desired resolution.

In order to solve the above problem, a system having four lenses has been suggested. In this system, the resolution can be improved even when the pixel pitch is 2 μm or less by compensating the chromatic aberration; however, the overall length of the lens system is increased when compared to the diagonal size of the solid state imaging device. Thus, a thin lens system cannot be obtained.

For fabricating a thin lens system, the back focal length can be reduced; but if the back focal length is too short, the space for an infra red (IR) filter is reduced, and thus, a glass such as a cut filter cannot be inserted in the rear portion of the lens system or the adjusting space in an assembling process may be decreased. In addition, it is advantageous to realize a thin lens system when the exit angle is increased, but if a ray incident on the thin lens system is inclined, a shading problem may occur, that is, an actual aperture efficiency is reduced.

SUMMARY OF THE INVENTION

The present invention provides a compact, high resolution lens system.

According to an aspect of the present invention, there is provided a lens system comprising: a first lens which is a meniscus lens having positive refractive power and having aspheric surfaces on both sides and a convex surface on the object side; a second lens formed of a biconcave lens having aspheric surfaces on both sides; a third lens having aspheric surfaces on both sides and having positive refractive power; and a fourth lens formed of a biconcave lens having aspheric surfaces on both sides and an inflection point on an upper aspheric surface of an image side, wherein the first through fourth lenses are arranged sequentially from the object, and an aperture diaphragm is disposed on the object side surface of the first lens, which faces the object, or in front of the first lens.

The lens system may satisfy the following inequality $$0.15 < A < 0.5,$$

where A denotes the ratio of the distance from an optical axis to the inflection point with respect to an effective radius of the object side surface in the fourth lens.

The lens system may satisfy following conditional expression $$0.5 < f/|f2| < 1,$$

where f denotes the focal length of the lens system, and f2 denotes the focal length of the second lens.

The lens system may satisfy the following inequalities $$0.3 < f1/|f2| < 0.7 \text{ and } 1 < f3/|f4| < 1.5,$$

where f1 denotes the focal length of the first lens, f2 denotes the focal length of the second lens, f3 denotes the focal length of the third lens, and f4 denotes the focal length of the fourth lens.

The lens system may satisfy the following inequalities $$15 < v1 - v2 < 50 \text{ and } 0.9 < v3/v4 < 1.1,$$

where v1 denotes an Abbe's number of the first lens, v2 denotes an Abbe's number of the second lens, v3 denotes an Abbe's number of the third lens, and v4 denotes an Abbe's number of the fourth lens.

BRIEF DESCRIPTION OF THE DRAWINGS

The above and other features and advantages of the present invention will become more apparent by the following detailed description of exemplary embodiments thereof with reference to the attached drawings in which.

DETAILED DESCRIPTION OF THE INVENTION

Figure 1:
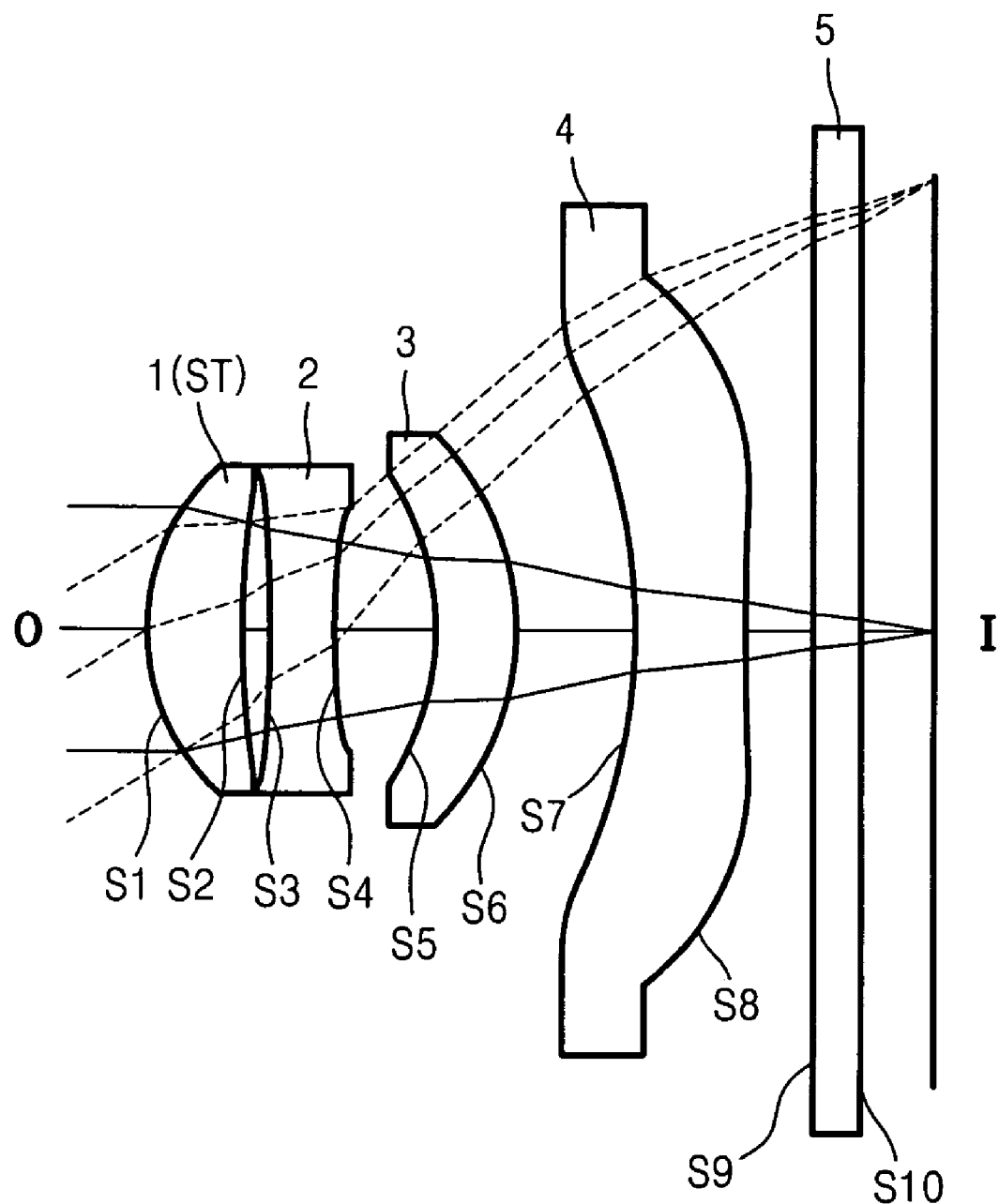
FIG. 1 is a diagram of a lens system according to an embodiment of the present invention.

Referring to FIG. 1, a lens system according to an embodiment of the present invention includes a first lens 1 of positive refractive power and having aspheric surfaces on both sides thereof and a convex surface on the side facing an object (O), a second lens 2 having aspheric surfaces on both sides thereof, a third lens 3 of positive refractive power and having aspheric surfaces on both sides thereof, and a fourth lens 4 having aspheric surfaces on both sides thereof. The aspheric surface on the image side of the fourth lens 4 has an inflection point within the range of an effective the radius. The effective radius denotes the maximum height of a ray passing a lens surface when the ray has the largest field of view, that is, the distance from an optical axis, and the inflection point is a point where an angle of a tangent plane on the aspheric surface is gradually increasing (or reducing) from the optical axis to the peripheral portion, reduces (or increases) reversely. On the other hand, an aperture diaphragm ST having a predetermined aperture may be disposed on a surface of the first lens 1 facing the object side O or in front of the first lens 1. In FIG. 1, the aperture diaphragm ST is disposed on the object side surface S1 of the first lens 1.

According to an embodiment of the present invention, the aperture diaphragm having a predetermined aperture is disposed on the object side surface of the first lens 1 or in front of the first lens 1, the first lens 1 is formed of a meniscus lens with positive refractive power and having a convex surface toward the object side, and the second lens 2 is formed of a biconcave lens, and thus, an appropriate back focal length can be ensured by reducing the overall length of the lens system and limiting the exit angle. Generally, the aperture diaphragm may be disposed between the first lens 1 and the second lens 2 in order to compensate for aberration; in this case, the distance to the exit pupil with respect to the overall length of the lens system is reduced, and the exit angle is increased. When the exit angle is increased, the resolution is reduced, and when the increased exit angle is compensated, the entire length of the lens system is elongated, and thus, it is difficult to form a small sized lens system. The overall length of the lens system denotes the largest length between a length from the aperture diaphragm to a focal position and a length from the apex of the object side surface in the first lens to the focal position.

According to the present invention, all of the surfaces of the lenses are formed as aspheric surfaces, and thus, the aberration can be improved efficiently. For example, an aberration around the optical axis can be compensated on the aspheric surfaces of the first and second lenses 1 and 2, and an aberration of the peripheral portion of the optical axis can be compensated on the aspheric surfaces of the third and fourth lenses 3 and 4.

The first lens 1 can be a meniscus lens, the second lens 2 can be a biconcave lens, and the fourth lens 4 can be a biconcave lens.

Both surfaces of the fourth lens 4 are aspheric, and the aspheric surface on the image side has an inflection point. The lens system of the current embodiment satisfies the following inequality.

$$0.15 < A < 0.5 \tag{1}$$

where, A denotes a ratio of the length from the optical axis to the inflection point with respect to the effective radius on the object side surface of the fourth lens. As described above, since the fourth lens is formed to have the inflection point, spherical aberration and chromatic aberration can be compensated and the desired resolution can be obtained. When the lens system satisfies inequality 1, the aberration between the optical axis and the center portion of the lens (position deviation of the image sides) that easily occurs when the object surface of the fourth lens is concave can be effectively compensated. If the inflection point in condition 1 exceeds the upper limit value, the aberration of the peripheral portion of the optical axis is easily compensated, but it is difficult to compensate for the aberration between the optical axis to the center portion of the lens, in particular, the position of the image side surface.

The fourth lens 4 has a biconcave shape and the aspheric surface on the image side surface (I) has an inflection point within the range of inequality 1. Thus, the aberration of the peripheral portion of the optical axis caused by the reduction of the overall length of the lens system can be compensated and the exit angle also can be compensated. In addition, the object surface of the fourth lens 4 has a concave shape, and a value T/D can be less than 1 while compensating for the aberration. T denotes the overall length of the lens system, and D denotes the diagonal size of the solid state imaging device. On the contrary, when the fourth lens 4 is formed as a meniscus lens with negative refractive power and having a convex surface toward the object, it is very difficult to make the value T/D smaller than 1 while reducing the overall length of the lens system.

Next, the lens system of the present invention can satisfy the following inequality.

$$0.5 < f/|f2| < 1 \tag{2}$$

Inequality 2 defines a ratio of the overall focal length with respect to a focal length of the second lens 2, wherein f denotes the overall focal length of the lens system and f2 denotes the focal length of the second lens 2. When the lens system satisfies inequality 2, an appropriate back focal length (Bf) can be ensured while reducing the overall length of the lens system. However, when the lens system exceeds the range of inequality 2, it is difficult to reduce the overall length of the lens system while compensating for the aberration or to ensure the desired back focal length Bf.

In addition, the lens system according to an embodiment of the present invention can satisfy the following inequalities.

$$0.3 < f1/|f2| < 0.7 \tag{3}$$

$$1 < f3/|f4| < 1.5 \tag{4}$$

where, f1 denotes the focal length of the first lens 1, f2 denotes the focal length of the second lens, f3 denotes the focal length of the third lens 3, and f4 denotes the focal length of the fourth lens 4. When the lens system satisfies inequalities 3 and 4, the aberration can be compensated easily. When the lens system satisfies inequality 3, the aberration of the optical axis can be compensated easily while reducing the overall length of the lens system, and when the lens system satisfies conditional expression 4, the aberration of the peripheral portion of the optical axis can be compensated easily. When the lens system exceeds the ranges of inequalities 3 and 4, it is difficult to compensate the aberration while maintaining the desired exit angle by reducing the overall length of the lens system.

In addition, the lens system according to an embodiment of the present invention can satisfy the inequalities.

$$15 < v1 - v2 < 50 \tag{5}$$

$$0.9 < v3/v4 < 1.1 \tag{6}$$

where, v 1 denotes Abbe's number of the first lens 1, v 2 denotes Abbe's number of the second lens 2, v 3 denotes Abbe's number of the third lens 3, and v 4 denotes Abbe's number of the fourth lens 4.

When the lens system of the present invention satisfies inequalities 5 and 6, the chromatic aberration can be compensated easily. When the lens system satisfies inequality 5, the longitudinal chromatic aberration and the lateral chromatic aberration can be easily compensated. In addition, inequality 6 is related to the compensation of the lateral chromatic aberration throughout the entire lens system. If the lens system exceeds the condition of the conditional expression 6, the chromatic aberration between the optical axis and the center portion of the lens can be easily compensated, but it is difficult to compensate the lateral chromatic aberration of the peripheral portion of the lens. Otherwise, the chromatic aberration of the peripheral portion of the lens can be compensated easily, but it is difficult to compensate the lateral chromatic aberration on the center portion of the lens.

According to an embodiment of the present invention, the lens system having a sufficient resolution that can correspond to the pixel pitch of 2 μm or less of the solid state imaging device (CCD) and having a thin thickness, that is, having the value T/D (the ratio between the overall length T of the lens system and the diagonal size of the solid state imaging device) of 1 or less, can be provided. In addition, the desired Bf, for example, 0.95 mm or longer with an insertion glass, can be ensured while restraining the exit angle within a range of 20° to 25°, so as not to generate a problem in a shading property.

The aspheric surface in the embodiments of the present invention can be defined as follows.

The aspheric surface of the lens system according to the present invention can be represented by the following expression when the direction of the optical axis is the X axis and the direction perpendicular to the optical axis direction is the Y axis, and a proceeding direction of the ray is set as a positive direction. Here, x denotes the distance from the apex of the lens in the optical axis direction, h denotes the distance in a direction perpendicular to the optical axis, K denotes a conic constant, A, B, C, and D denote aspheric coefficients, and c denotes the inverse of the radius of curvature (1/R) at the top of the lens.

$$x = \frac{cy^2}{1+\sqrt{1-(K+1)c^2h^2}} + Ah^4 + Bh^6 + Ch^8 + Dh^{10} \quad (7)$$

The present invention can include various lenses according to optimal conditions for realizing a small-sized lens system through the following embodiments.

Next, detailed lens data in the embodiments of the lens system according to the present invention will be described. Hereinafter, f denotes the focal length of the entire lens system, FNo denotes the number of F, w denotes half of the viewing angle, Bf denotes the back focal length, and ST denotes the diaphragm.

EMBODIMENT 1

FIG. 1 shows a lens system according to an embodiment of the present invention, and reference numeral 5 denotes a filter. Design data of the lens system according to the current embodiment are as follows.

Object distance; infinite,
f; 4.55 mm,
FNo; 2.94,
w; 32.2°
Exit angle; 24.8°,
Bf(air); 1.062 mm,
Bf(including rear glass); 1.164 mm
Value of T/D; 4.797/5.7 = 0.842

| surface | radius of curvature | interval | refractive index | Abbe's number |
|---|---|---|---|---|
| S1(ST) | 1.4775 | 0.593 | 1.69008 | 53.2 |
| S2 | 5.0682 | 0.164 | | |
| S3 | −6.8347 | 0.400 | 1.63200 | 23.4 |
| S4 | 7.8732 | 0.631 | | |

-continued

| | | | | |
|---|---|---|---|---|
| S5 | −2.1226 | 0.500 | 1.53318 | 57.0 |
| S6 | −1.5412 | 0.748 | | |
| S7 | −4.7352 | 0.700 | 1.53318 | 57.0 |
| S8 | 11.3275 | 0.414 | | |
| S9 | INFINITY | 0.300 | 1.51680 | 64.2 |
| S10 | INFINITY | 0.450 | | |
| IMG | INFINITY | 0.000 | | |

<aspheric coefficients>

| | |
|---|---|
| S1 | K: 0.463216<br>A: −.160433E−01 B: 0.109091E−01 C: −.368420E−01<br>D: 0.195185E−01 |
| S2 | K: 0.000000<br>A: −.286002E−01 B: −.100935E−02 C: −.118821E−02<br>D: −.757342E−03 |
| S3 | K: 0.000000<br>A: 0.250805E−01 B: −.294566E−01 C: 0.926425E−01<br>D: −.925863E−01 |
| S4 | K: 14.781565<br>A: 0.123512E+00 B: 0.766502E−01 C: −.503755E−01<br>D: 0.108034E+00 |
| S5 | K: 1.095637<br>A: −.415616E−01 B: 0.288804E−02 C: 0.171083E−01<br>D: −.100904E−01 |
| S6 | K: 0.302832<br>A: 0.246892E−01 B: −.283931E−02 C: 0.287300E−01<br>D: 0.757955E−04 |
| S7 | K: 1.427579<br>A: −.380804E−01 B: 0.129103E−01 C: −.406847E−03<br>D: −.101415E−03 |
| S8 | K: 0.000000<br>A: −.499104E−01 B: 0.734534E−02 C: −.143693E−02<br>D: 0.112715E−03 |

Figure 2:
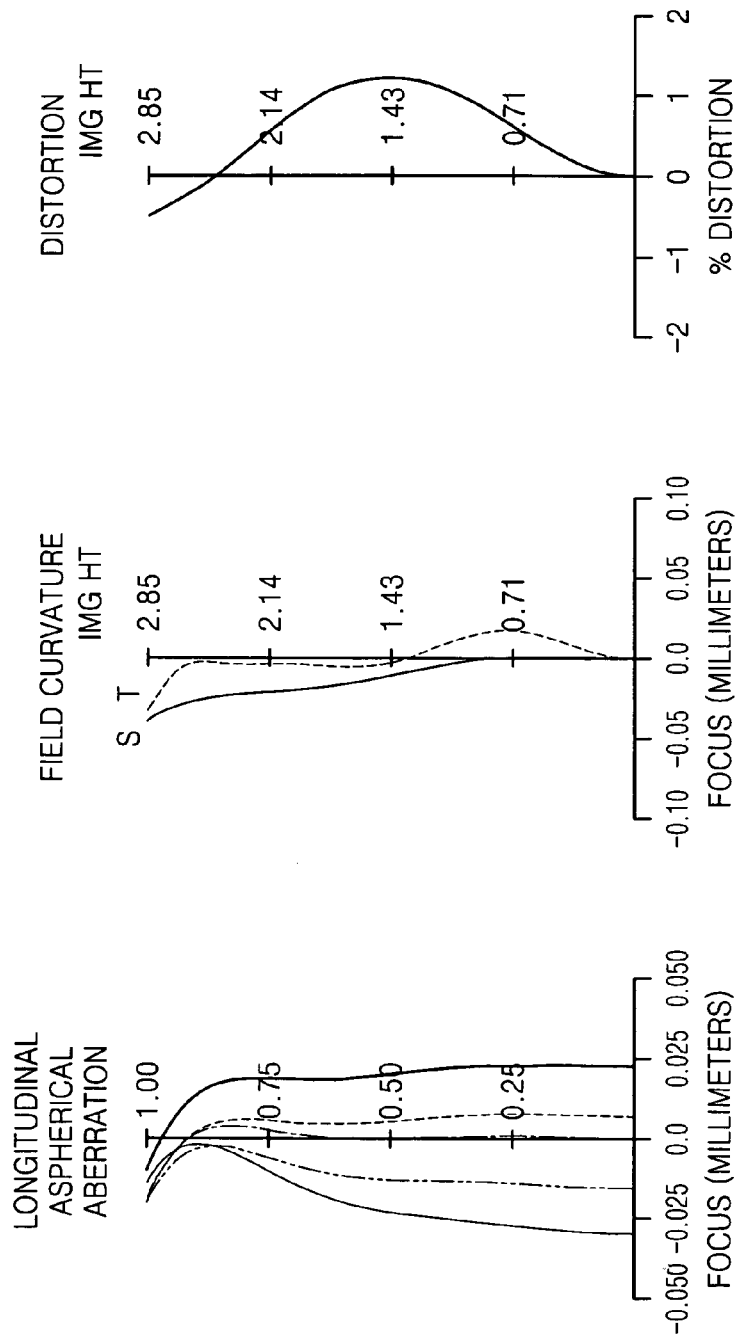
FIG. 2 is a diagram showing spherical aberration, field curvature, and distortion of the lens system shown in FIG. 1.
Figure 3:
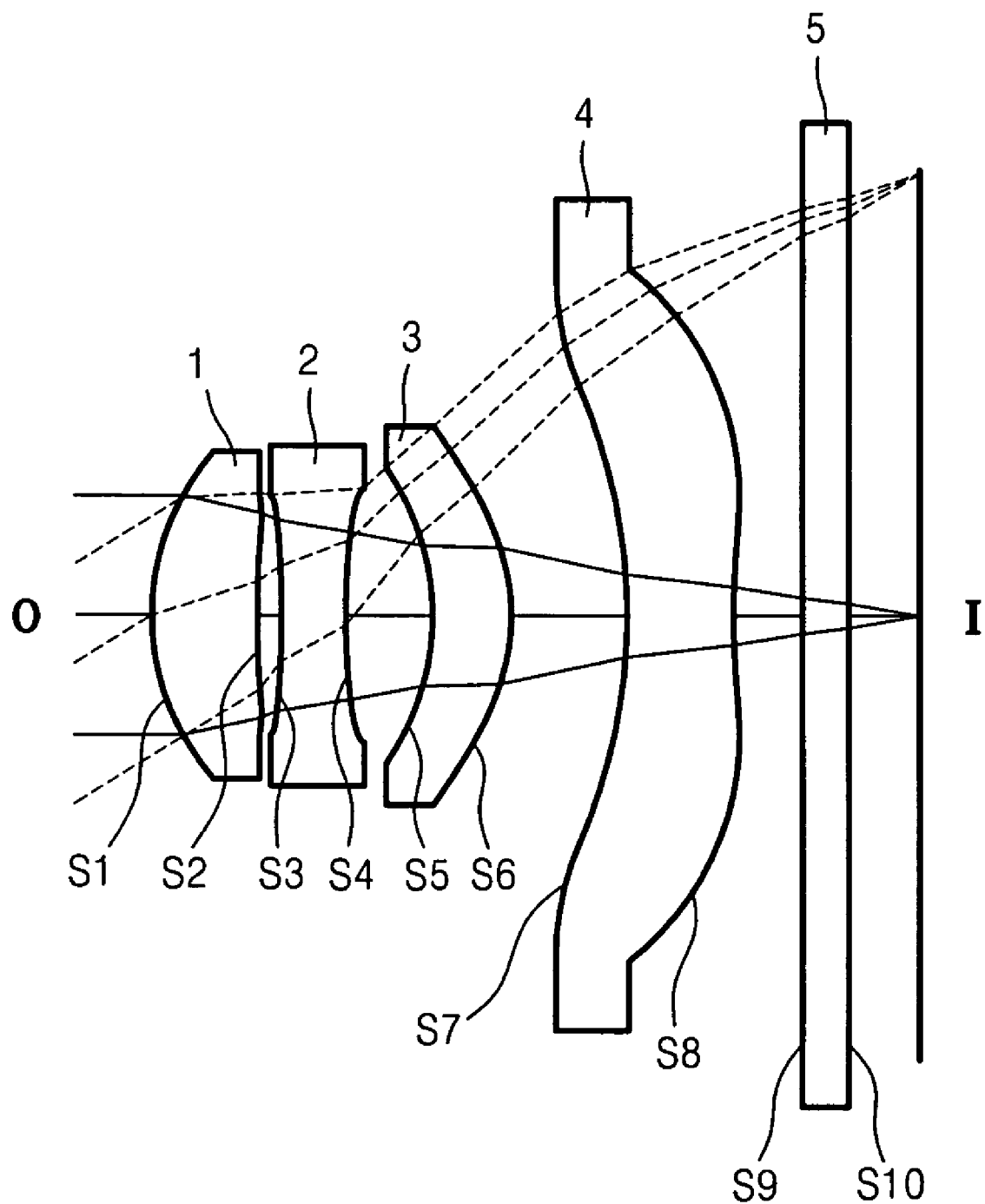
FIG. 3 is a diagram of a lens system according to another embodiment of the present invention.
Figure 4:
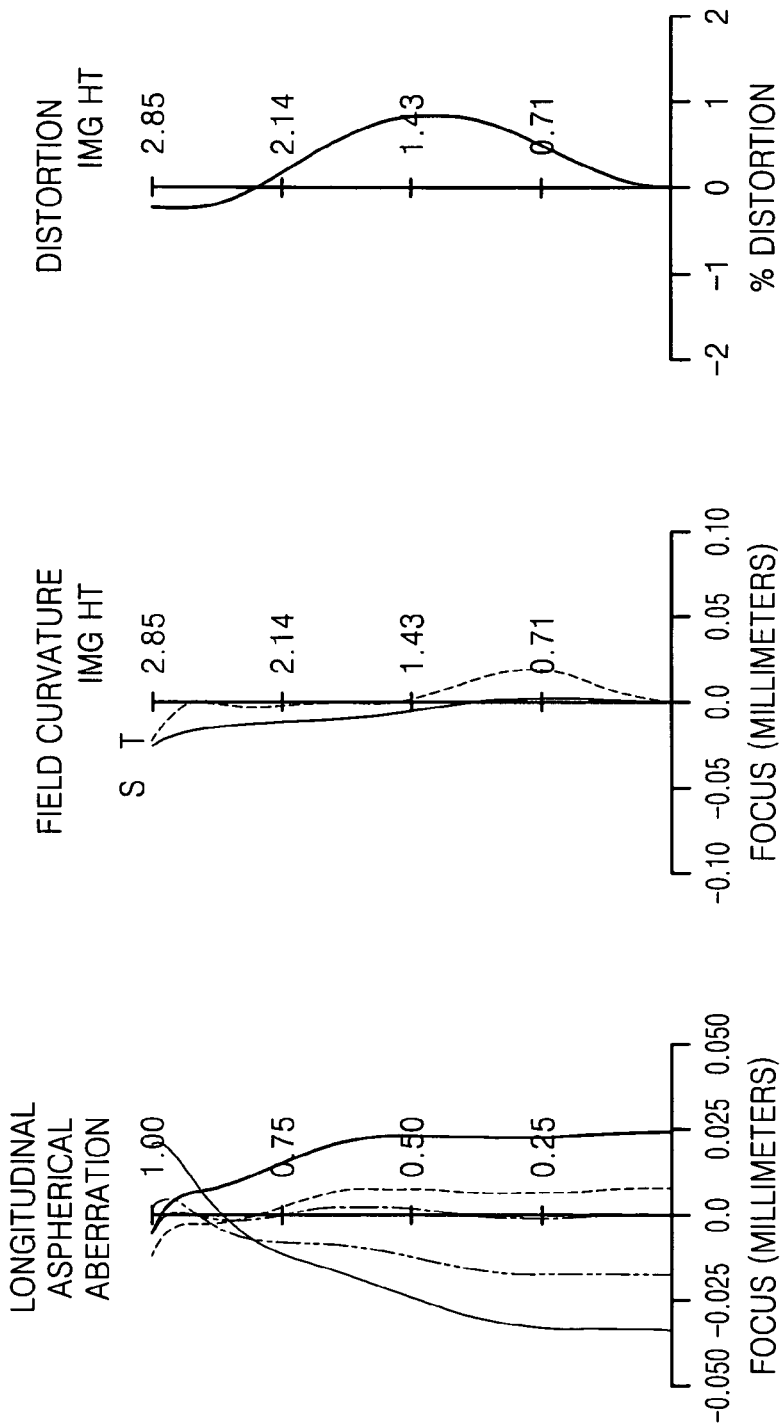
FIG. 4 is a diagram showing spherical aberration, field curvature, and distortion of the lens system shown in FIG. 3.
Figure 5:
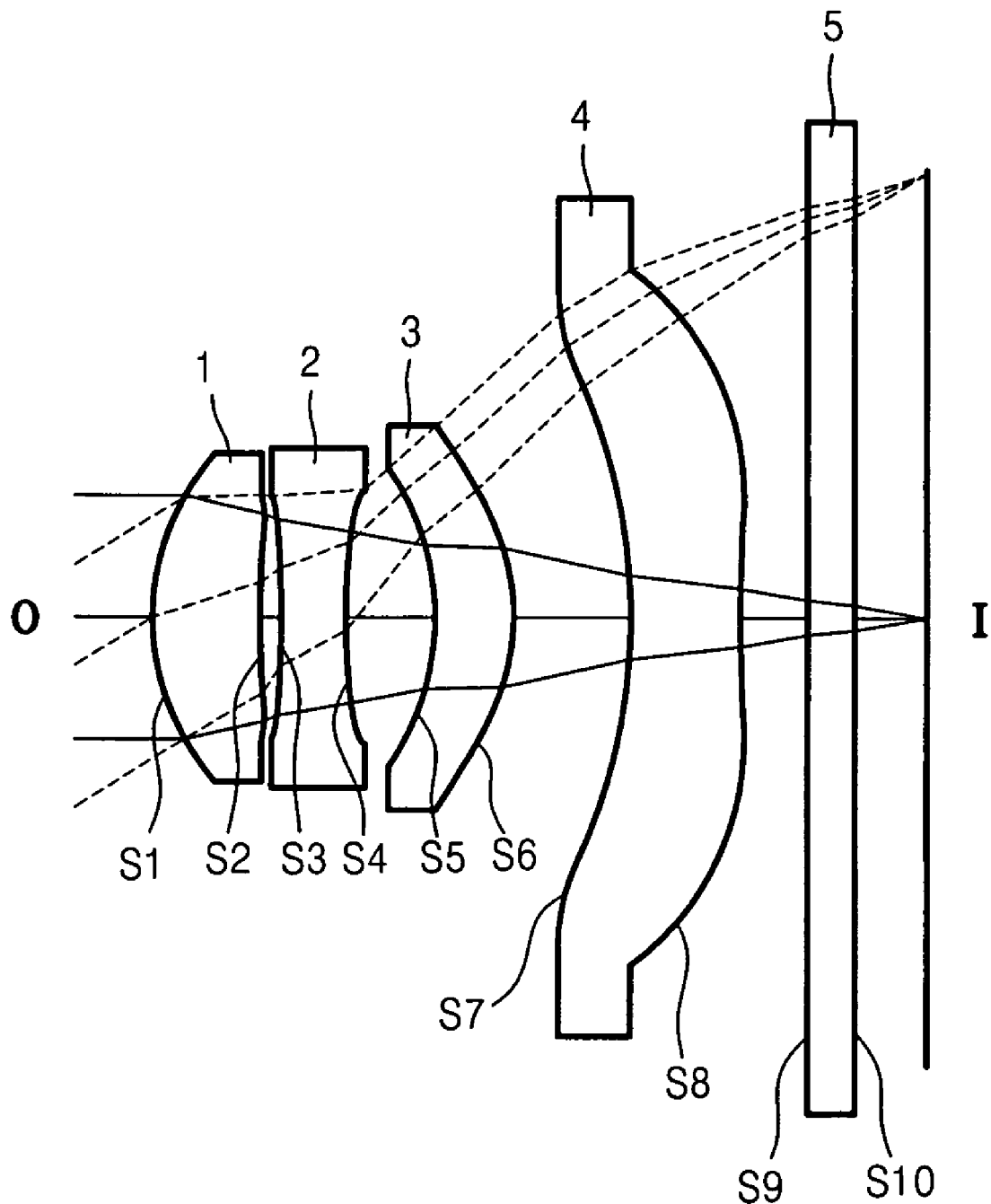
FIG. 5 is a diagram of a lens system according to another embodiment of the present invention.
Figure 6:
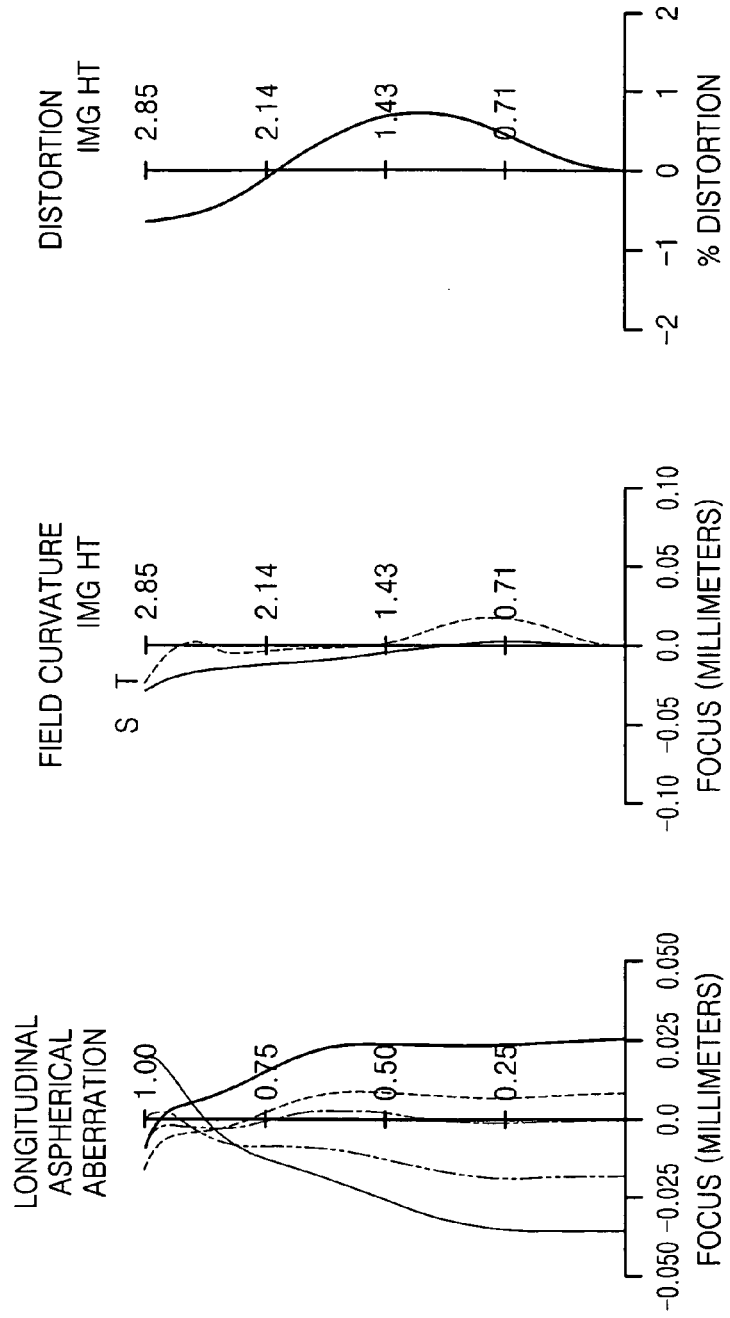
FIG. 6 is a diagram showing spherical aberration, field curvature, and distortion of the lens system shown in FIG. 5.

FIG. 2 shows spherical aberration, field curvature, and distortion of the lens system according to the current embodiment of the present invention. The field curvature includes a tangential field curvature (T) and a sagittal field curvature (S).

EMBODIMENT 2

Object distance; infinite
focal length; 4.54 mm
FNo; 2.94
half of the viewing angle; 32.2°
exit angle; 25.0°
Bf(air); 1.068 mm
Bf(including rear glass); 1.170 mm
Value of T/D; 4.798/5.7 = 0.842

| | radius of curvature | interval | refractive index | Abbe's number |
|---|---|---|---|---|
| S1(ST) | 1.51194 | 0.670 | 1.69008 | 53.2 |
| S2 | 5.31625 | 0.150 | | |
| S3 | −8.15788 | 0.400 | 1.63200 | 23.4 |
| S4 | 6.88958 | 0.562 | | |
| S5 | −1.90564 | 0.500 | 1.53318 | 57.0 |
| S6 | −1.41409 | 0.748 | | |
| S7 | −4.07088 | 0.700 | 1.53318 | 57.0 |
| S8 | 13.18805 | 0.410 | | |
| S9 | INFINITY | 0.300 | 1.51680 | 64.2 |
| S10 | INFINITY | 0.460 | | |
| IMG | INFINITY | 0.000 | | |

<aspheric coefficients>

| | |
|---|---|
| S1 | K: −0.073251<br>A: 0.773325E−02 B: −.121001E−01 C: 0.347984E−01<br>D: −.466565E−01 |
| S2 | K: 0.000000<br>A: −.395068E−01 B: −.946271E−01 C: 0.174790E−01<br>D: −.118394E+00 |

-continued

| | |
|---|---|
| S3 | K: 0.000000<br>A: −.853162E−02 B: −.120389E+00 C: 0.783160E−01<br>D: −.152454E+00 |
| S4 | K: 29.340662<br>A: 0.980253E−01 B: 0.302491E−01 C: −.169318E−01<br>D: 0.109637E+00 |
| S5 | K: 1.339694<br>A: −.259577E−01 B: 0.226570E−01 C: 0.840715E−02<br>D: −.108247E−01 |
| S6 | K: 0.142064<br>A: 0.405416E−01 B: 0.471296E−02 C: 0.327502E−01<br>D: −.617456E−03 |
| S7 | K: 0.699570<br>A: −.260040E−01 B: 0.112674E−01 C: −.569030E−03<br>D: −.643115E−04 |
| S8 | K: 0.000000<br>A: −.506441E−01 B: 0.733496E−02 C: −.139689E−02<br>D: 0.105734E−03 |

EMBODIMENT 3

Object distance; infinite
focal length; 4.57 mm
FNo; 2.94
half of the viewing angle; 32.1°
Exit angle; 25.0°
Bf(including air); 1.068 mm
Bf(including rear glass); 1.170 mm
Value of T/D; 4.798/5.70 = 0.842

| | radius of curvature | interval | refractive index | Abbe's number |
|---|---|---|---|---|
| S1(ST) | 1.50432 | 0.670 | 1.69008 | 53.2 |
| S2 | 5.06600 | 0.142 | | |
| S3 | −9.31311 | 0.400 | 1.63200 | 23.4 |
| S4 | 6.60083 | 0.569 | | |
| S5 | −1.88655 | 0.496 | 1.53318 | 57.0 |
| S6 | −1.41742 | 0.753 | | |
| S7 | −3.92321 | 0.700 | 1.53318 | 57.0 |
| S8 | 14.33040 | 0.420 | | |
| S9 | INFINITY | 0.300 | 1.51680 | 64.2 |
| S10 | INFINITY | 0.450 | | |
| IMG | INFINITY | 0.000 | | |

<aspheric coefficients>

| | |
|---|---|
| S1 | K: −0.075310<br>A: 0.758325E−02 B: −.122299E−01 C: 0.349701E−01<br>D: −.458337E−01 |
| S2 | K: 0.000000<br>A: −.405709E−01 B: −.969446E−01 C: 0.161929E−01<br>D: −.116837E+00 |
| S3 | K: 0.000000<br>A: 0.907281E−02 B: −.120741E+00 C: 0.801632E−01<br>D: −.154025E+00 |
| S4 | K: 29.185770<br>A: 0.977258E−01 B: 0.308518E−01 C: −.132978E−01<br>D: 0.112021E+00 |
| S5 | K: 1.323874<br>A: −.231120E−01 B: 0.233887E−01 C: 0.769382E−02<br>D: −.111013E−01 |
| S6 | K: 0.144271<br>A: 0.425056E−01 B: 0.618286E−02 C: 0.323716E−01<br>D: −.121572E−02 |
| S7 | K: 0.628952<br>A: −.248930E−01 B: 0.113065E−01 C: −.571092E−03<br>D: −.660843E−04 |
| S8 | K: 0.000000<br>A: −.510307E−01 B: 0.739725E−02 C: −.139838E−02<br>D: 0.105302E−03 |

The following table shows that the lens systems of the first through third embodiments of the present invention respectively satisfy inequalities 1 through 6.

TABLE 1

| | Embodiment 1 | Embodiment 2 | Embodiment 3 |
|---|---|---|---|
| Expression 1 | 0.7/2.13 = 0.33 | 0.64/2.27 = 0.28 | 0.61/2.23 = 0.27 |
| Expression 2 | 4.55/\|−5.67\| = 0.802 | 4.54/\|−5.79\| = 0.784 | 4.57/\|−5.99\| = 0.763 |
| Expression 3 | 2.82/\|−5.67\| = 0.497 | 2.84/\|−5.79\| = 0.491 | 2.87/\|−5.99\| = 0.479 |
| Expression 4 | 8.09/\|−6.14\| = 1.318 | 7.56/\|−5.73\| = 1.32 | 7.78/\|−5.68\| = 1.370 |
| Expression 5 | 53.2 − 23.4 = 29.8 | 53.2 − 23.4 = 29.8 | 53.2 − 23.4 = 29.8 |
| Expression 6 | 57/57 = 1 | 57/57 = 1 | 57/57 = 1 |

As described above, according to the embodiments of the present invention, a small and thin lens system that is used in electronic still cameras, vehicle cameras, mobile phone terminals, portable information terminals such as PDAs, and PC cameras is provided.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A lens system comprising:
a first lens, wherein the first lens is a meniscus lens with positive refractive power and having aspheric surfaces on both sides and a convex surface on an object side;
a second lens formed of a biconcave lens having aspheric surfaces on both sides;
a third lens having aspheric surfaces on both sides and having positive refractive power; and
a fourth lens formed of a biconcave lens having aspheric surfaces on both sides and an inflection point on an upper aspheric surface of an image side,
wherein the first through fourth lenses are arranged sequentially from the object, and an aperture diaphragm is disposed on the object side of the first lens.

2. The lens system of claim 1, wherein the lens system satisfies the following inequality:

$$0.15 < A < 0.5,$$

where A denotes the ratio of the distance from the optical axis to the inflection point with respect to an effective radius of the object side surface in the fourth lens.

3. The lens system of claim 2, wherein the lens system satisfies the following conditional expression:

$$0.5 < f/|f2| < 1,$$

where f denotes the focal length of the lens system, and f2 denotes the focal length of the second lens.

4. The lens system of claim 2, wherein the lens system satisfies the following inequalities:

$$0.3 < f1/|f2| < 0.7 \text{ and } 1 < f3/|f4| < 1.5,$$

where f1 denotes the focal length of the first lens, f2 denotes the focal length of the second lens, f3 denotes the focal length of the third lens, and f4 denotes the focal length of the fourth lens.

5. The lens system of claim 2, wherein the lens system satisfies the following inequalities:

$$15 < \nu 1 - \nu 2 < 50 \text{ and } 0.9 < \nu 3/\nu 4 < 1.1,$$

where $v1$ denotes an Abbe's number of the first lens, $v2$ denotes an Abbe's number of the second lens, $v3$ denotes an Abbe's number of the third lens, and $v4$ denotes an Abbe's number of the fourth lens.

6. The lens system of claim 1, wherein the lens system satisfies the following inequality:

$$0.5 < f/|f2| < 1,$$

where f denotes the focal length of the entire lens system, and f2 denotes the focal length of the second lens.

7. The lens system of claim 1, wherein the lens system satisfies the following inequalities:

$$0.3 < f1/|f2| < 0.7 \text{ and } 1 < f3/|f4| < 1.5,$$

where f1 denotes the focal length of the first lens, f2 denotes the focal length of the second lens, f3 denotes the focal length of the third lens, and f4 denotes the focal length of the fourth lens.

8. The lens system of claim 1, wherein the lens system satisfies the following inequalities:

$$15 < v1 - v2 < 50 \text{ and } 0.9 < v3/v4 < 1.1,$$

where $v1$ denotes an Abbe's number of the first lens, $v2$ denotes an Abbe's number of the second lens, $v3$ denotes an Abbe's number of the third lens, and $v4$ denotes an Abbe's number of the fourth lens.

* * * * *